US011866199B2

(12) United States Patent
Hance et al.

(10) Patent No.: US 11,866,199 B2
(45) Date of Patent: Jan. 9, 2024

(54) MANAGED CONNECTING SERVICE FOR MASS TRANSIT BAGGAGE

(71) Applicant: Air Black Box Technologies LLC, Miami, FL (US)

(72) Inventors: Nicholas Hance, London (GB); Andrew Bliesner, London (GB); Timothy O'Neil-Dunne, Kirkland, WA (US)

(73) Assignee: Air Black Box Technologies LLC, Miami, FL (US)

( * ) Notice: Subject to any disclaimer, the term of this patent is extended or adjusted under 35 U.S.C. 154(b) by 0 days.

(21) Appl. No.: 17/710,969

(22) Filed: Mar. 31, 2022

(65) Prior Publication Data

US 2022/0227500 A1 Jul. 21, 2022

Related U.S. Application Data

(63) Continuation of application No. 16/876,983, filed on May 18, 2020, now Pat. No. 11,319,089.

(60) Provisional application No. 62/993,974, filed on Mar. 24, 2020, provisional application No. 62/849,946, filed on May 19, 2019.

(51) Int. Cl.
| | |
|---|---|
| *B64F 1/36* | (2017.01) |
| *G06Q 10/02* | (2012.01) |
| *H04W 4/80* | (2018.01) |
| *B64D 11/00* | (2006.01) |
| *G06F 9/54* | (2006.01) |

(52) U.S. Cl.
CPC .............. *B64F 1/368* (2013.01); *B64D 11/00* (2013.01); *G06F 9/541* (2013.01); *G06Q 10/025* (2013.01); *H04W 4/80* (2018.02)

(58) Field of Classification Search
None
See application file for complete search history.

(56) References Cited

U.S. PATENT DOCUMENTS 5,920,053 A * 7/1999 DeBrouse ............... B64F 1/366
235/375
7,136,832 B2 11/2006 Li et al.
(Continued)

FOREIGN PATENT DOCUMENTS

| AU | 2018204065 | 6/2018 |
|---|---|---|
| AU | 2016269559 | 11/2018 |

(Continued)

OTHER PUBLICATIONS (2017) IATA Type B Bag Messages and Baggage Messaging Refresher, The JavaDude Weblog, 5 Pages.
(Continued)

*Primary Examiner* — K. Wong
(74) *Attorney, Agent, or Firm* — Mintz, Levin, Cohn, Ferris, Glovsky and Popeo, P.C.

(57) ABSTRACT

Systems and methods for interlining checked bags between two unaffiliated airlines. The traveler may purchase the interlining service and be assured that the checked bags associated with that service will be automatically transferred from their first flight to their next flight. The traveler does not have to collect the checked bag, and then re-check it onto the second flight, which may allow a traveler to say with in the security zone of the airport, where permitted by airport flow.

15 Claims, 4 Drawing Sheets

(56) References Cited

U.S. PATENT DOCUMENTS

| | | | |
|---|---|---|---|
| 7,322,286 | B2 | 1/2008 | Labeille et al. |
| 7,916,025 | B2 * | 3/2011 | Locker .................. G08B 21/24 |
| | | | 340/539.22 |
| 8,849,560 | B2 * | 9/2014 | Stefani ............... G06Q 30/0281 |
| | | | 701/410 |
| 9,150,348 | B2 | 10/2015 | Naber et al. |
| 9,460,412 | B2 | 10/2016 | Gates et al. |
| 9,460,572 | B2 | 10/2016 | Cheikh et al. |
| 9,761,104 | B1 | 9/2017 | Gleason |
| 9,877,296 | B2 * | 1/2018 | Kelly .................. G06K 19/025 |
| 10,055,620 | B2 * | 8/2018 | Bruce ................ G06Q 10/0833 |
| 10,095,486 | B2 | 10/2018 | Findlay et al. |
| 10,360,785 | B2 * | 7/2019 | Malinofsky ............ G08B 21/24 |
| 10,613,533 | B1 | 4/2020 | Payson et al. |
| 10,628,783 | B2 | 4/2020 | Lau et al. |
| 10,650,654 | B2 | 5/2020 | Batra et al. |
| 10,685,311 | B2 | 6/2020 | Gates et al. |
| 11,319,089 | B2 | 5/2022 | Hance et al. |
| 2006/0207989 | A1 | 9/2006 | Ritchie et al. |
| 2017/0308972 | A1 | 10/2017 | Atkins et al. |
| 2018/0165617 | A1 | 6/2018 | Gates et al. |
| 2018/0182017 | A1 | 6/2018 | O'neil-Dunne et al. |
| 2019/0138949 | A1 | 5/2019 | Malinofsky et al. |
| 2019/0147558 | A1 | 5/2019 | Cheikh et al. |
| 2019/0354902 | A1 | 11/2019 | Huntley et al. |
| 2020/0068020 | A1 | 2/2020 | O'sullivan et al. |
| 2020/0110751 | A1 | 4/2020 | O'sullivan et al. |
| 2020/0265038 | A1 | 8/2020 | Atkins et al. |
| 2021/0097188 | A1 | 4/2021 | Findlay et al. |
| 2021/0117709 | A1 | 4/2021 | Halet |

FOREIGN PATENT DOCUMENTS

| | | |
|---|---|---|
| AU | 2019293529 A1 | 2/2021 |
| CN | 203990147 U | 12/2014 |
| CN | 205346331 U | 6/2016 |
| CN | 107209270 A | 9/2017 |
| CN | 107840673 A | 3/2018 |
| CN | 107851226 A | 3/2018 |
| CN | 110603831 A | 12/2019 |
| DE | 212018000068 U1 | 4/2019 |
| EP | 0097879 A2 | 1/1984 |
| EP | 0706838 B1 | 8/2000 |
| EP | 3671558 A1 | 6/2020 |
| EP | 3716148 A1 | 9/2020 |
| EP | 3723009 A1 | 10/2020 |
| EP | 3754574 A1 | 12/2020 |
| EP | 3786836 A1 | 3/2021 |
| FR | 2892712 A1 | 5/2007 |
| FR | 2919102 A1 | 1/2009 |
| FR | 2946967 A1 | 12/2010 |
| JP | H09134500 A | 5/1997 |
| KR | 101508533 B1 | 4/2015 |
| KR | 101603873 B1 | 3/2016 |
| WO | 2006029638 A1 | 3/2006 |
| WO | 2006029658 A1 | 3/2006 |
| WO | 2015192895 A1 | 12/2015 |
| WO | 2016102590 A1 | 6/2016 |
| WO | 2016113308 A1 | 7/2016 |
| WO | 2019234438 A1 | 12/2019 |
| WO | 2020124244 A1 | 6/2020 |
| WO | 2020254777 A1 | 12/2020 |
| WO | 2021038218 A1 | 3/2021 |

OTHER PUBLICATIONS

International Search Report and Written Opinion received for PCT Application No. PCT/US2020/033457, dated Sep. 11, 2020, 13 Pages.

McCarthy, Michael (2018) "Innovations in IATA Resolution 753 Baggage Tracking Solutions", URL:https://label.averydennison.com/content/dam/averydennison/lpm-responsive/na/doc/whitepaper-thought-leadership/product/intelligent-labels/industry-solutions/iata-special-report-rfid.pdf, 10 Pages.

Price, Andrew (2019) "Baggage Handling: the Secret Life of Luggage Through the Airport", https://www.internationalairportreview.com/article/79449/baggage-handling-secret-life-luggage, 6 Pages.

Jungyoon (May 18, 2018) "Delta Air Lines and Korean Air will be provided with through checked-in baggage even when issuing separate tickets", ITS Tours!: IT & Smart Tours, Naver blog [retrieved on Aug. 23, 2020]. Retrieved from the Internet: <URL: https://m.blog.naver.com/johnlee08/221278847678>, 1-4 Pages.

European Search Report issued in European Application No. 20810108.9, dated Jan. 9, 2023, 14 Pages.

* cited by examiner

MANAGED CONNECTING SERVICE FOR MASS TRANSIT BAGGAGE

CROSS-REFERENCE TO RELATED APPLICATIONS

This application is a continuation of U.S. patent application Ser. No. 16/876,983 filed May 18, 2020, entitled "MANAGED CONNECTING SERVICE FOR MASS TRANSIT BAGGAGE," which claims the benefit of U.S. Provisional Patent Application No. 62/849,946 filed on May 19, 2019, entitled "MANAGED CONNECTING SERVICE FOR MASS TRANSIT BAGGAGE", and U.S. Provisional Patent Application No. 62/993,974, filed on Mar. 24, 2020, entitled "MANAGED CONNECTING SERVICE FOR MASS TRANSIT BAGGAGE", the contents of both of which are expressly incorporated herein by this reference as though set forth in their entirety.

FIELD OF USE

Embodiments of the present disclosure generally relate to the field of baggage handling services. More specifically, embodiments of the disclosure relate to systems and methods for managed connecting services that has a through baggage system, a messaging system, a customer data record system, an Application Programming Interface (API) and a customer-facing interface, which ensure that checked bags are transferred properly from one mass transit (or public service) carrier to another. Although the system is primarily for use with airlines and airports, any intermodal transit carrier including land based (such as train or bus) or sea based (such as ferry or cruise) may benefit from the system of the present disclosure.

BACKGROUND

Currently, if a traveler books travel on two unaffiliated carriers, such that they are required to switch airlines at a stop (commonly referred to as a stopover) or layover, the traveler is required to pick up any checked luggage from the first leg of the flight and then re-check it with the second airline. Consumers have found that cheaper itineraries can be created by combining any flights such as LCC flights (often short haul) with FSC flights (often long haul). This combination of disparate carriers, including non-air transportation providers, which do not have systems that are directly connected or that are not compatible, has required customers to go get their checked bags from baggage claim after the first flight, thus leaving the security area of the airport, and then checking the bags with the next carrier, which requires going through security a second time. The bags cannot be transferred automatically from one carrier's system to another. The bags are not "checked through" to the customer's final destination.

Due to competitive concerns and issues, complete cross-border mergers and complete domestic interline agreements in the airline industry are unlikely for the foreseeable future, and there will be demand for further tools to facilitate passenger journeys involving unaffiliated airlines and other transport providers.

As the world of airline interlining and intermodal passenger transportation continues to move forward with inferior solutions, there is a global need for a next generation baggage service that:
Gives customer better and more appropriate choices;
Takes into consideration the stakeholders and agreements between the stakeholders, including:
Airports—Hub, Feeder, Domestic, International, multi-terminal, multi modal ports (e.g. Rail and Air)
Airlines—FSC (Full Service Carriers), LCC (Low Cost Carriers), HVC (Hybrid Value Carriers), carriers connected by a MITA (Multilateral Interline Traffic Agreement), and independent carriers
Passengers
Provides a solution that takes into consideration the customer, their journey, and the options available presenting a simple option for the customer to purchase a complete solution for the independent travel on participating airlines including through baggage service at most airports.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to a system and method that provide for the monitoring and transfer of checked bags between any two mass transit carriers. The system and method of the present disclosure typically involves a first airline and a second airline, but it may involve one or more of, but is not limited to: a train carrier and an airline; an airline and a cruise provider; more than two airlines; and the like.

The baggage transfer system and method allow for checked bags to connect through to the passenger's final destination even when the airlines have no formal alliance or interline or codeshare agreement, or the technical capability to achieve that agreement. The system and method may be computer based and may comprise one or more apps, software elements, identification tags and scans, which process and move the checked bags between the two airlines or other mass transit carriers. Specifically, bags may be connected between any two participating intermodal carriers or any two low cost carriers (LCC), between an LCC and a full-service carrier (FSC), neither of which is currently a service or system that was available before the present disclosure. With the system, the travelers do not need to leave the immigration/secure area of the airport (where airport flow permits) to retrieve checked bags from the first airline baggage check, go back to check-in and check the retrieved bags with the second airline, and then go back through security. Since the passenger going through the recheck process is frequently under time pressure to get to the next flight, the whole process is extremely stressful. Other benefits may include having the passengers spend more time in the terminal to eat and shop. Another benefit may be the creation of the electronic records, which may be beneficial to participating airlines, participating airports, and independent passengers.

In one embodiment, the through checked baggage service may be offered by the airlines or by intermediaries including but not limited to a conventional travel agency or online travel agency (OTA) at the time of purchasing the tickets. This may allow the service provider (airline, travel agency, and/or airport) to add value and collect additional revenue for providing the service, or used as a service differentiator.

In one embodiment, the journey of the checked bags is visible to the user directly via an app that provides messages or notifications to the traveler as the bags proceed through the various stages of the journey, or indirectly via an Application Program Interface that enables a third party to incorporate this information into a broader app or service. The virtual interline connection details may be entered into the passenger service system (PSS) of each of the two airlines (inbound and outbound) along with other relevant information.

Ports, stations, and airports (transportation hubs) may benefit from the checked bag through system because the checked bags may be transferred seamlessly between any two participating airlines/carriers that use the hub. The airport or hub becomes a connecting hub for all of the participating carriers. The stopover passengers spend more time in the security zone, which provides additional money spent with retailers. The airport or transportation hub also becomes known for a better passenger experience because when a traveler flies into the airport as a stopover, they will know they don't have to retrieve and re-check their bags. This creates a direct relationship between the airport and the passengers. This also improves the service offered to the airline partners. By offering the though baggage system for checked baggage, the airport may increase air traffic and expand their incoming and outgoing destination map by allowing baggage interlining.

In one embodiment the traveler books two independent flights and one of the airlines or the stopover airport upsells the customer on the service that is provided by the system and method of the present disclosure. The traveler checks in independently for each flight and checks one or more bags for the first flight. The system issues a baggage tag, which is placed on the checked baggage. The bag is loaded on to the first flight and, when it arrives at the stopover airport it is removed from the first flight and delivered by the airport/airline ground handling teams to the second flight, where it is loaded and then travels on the second flight all the way to baggage claim at the final destination of the traveler. The tagged bag follows the same basic path as would a bag on a normal connecting itinerary In one embodiment, the system of the present disclosure provides a managed connecting service for baggage that may intelligently generate messages drawn from an entire library of messages at each stage of the bags journey. The system may automate the process of establishing the eligibility of the customer in the selection of flights, airlines, airport, ground service points like ferry terminals, railway stations and the like, thus preventing mistakes being made. The system may accommodate all forms of baggage tags both currently in production and those mandated in the future, such as RFID. The system of the present disclosure is the only solution that can accommodate any form of interline with any participating airline and/or airport and/or baggage system.

In one embodiment the system may comprise a managed connecting service, a through bag service, a messaging system, the functionality to allow any service provider to address though baggage connections for the end customer, and an app or application program interface enabling the end customers and service providers to track, time track, engage, and provide information, and the functionality to ensure a positive hand off and change of custody to airports, then on completion of transition, to advise the status of the bag when new bag tag and second change of custody takes place and the bag arrives at the departing airport belt on time in the window for automated check in.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE EMBODIMENTS

Figure 1:
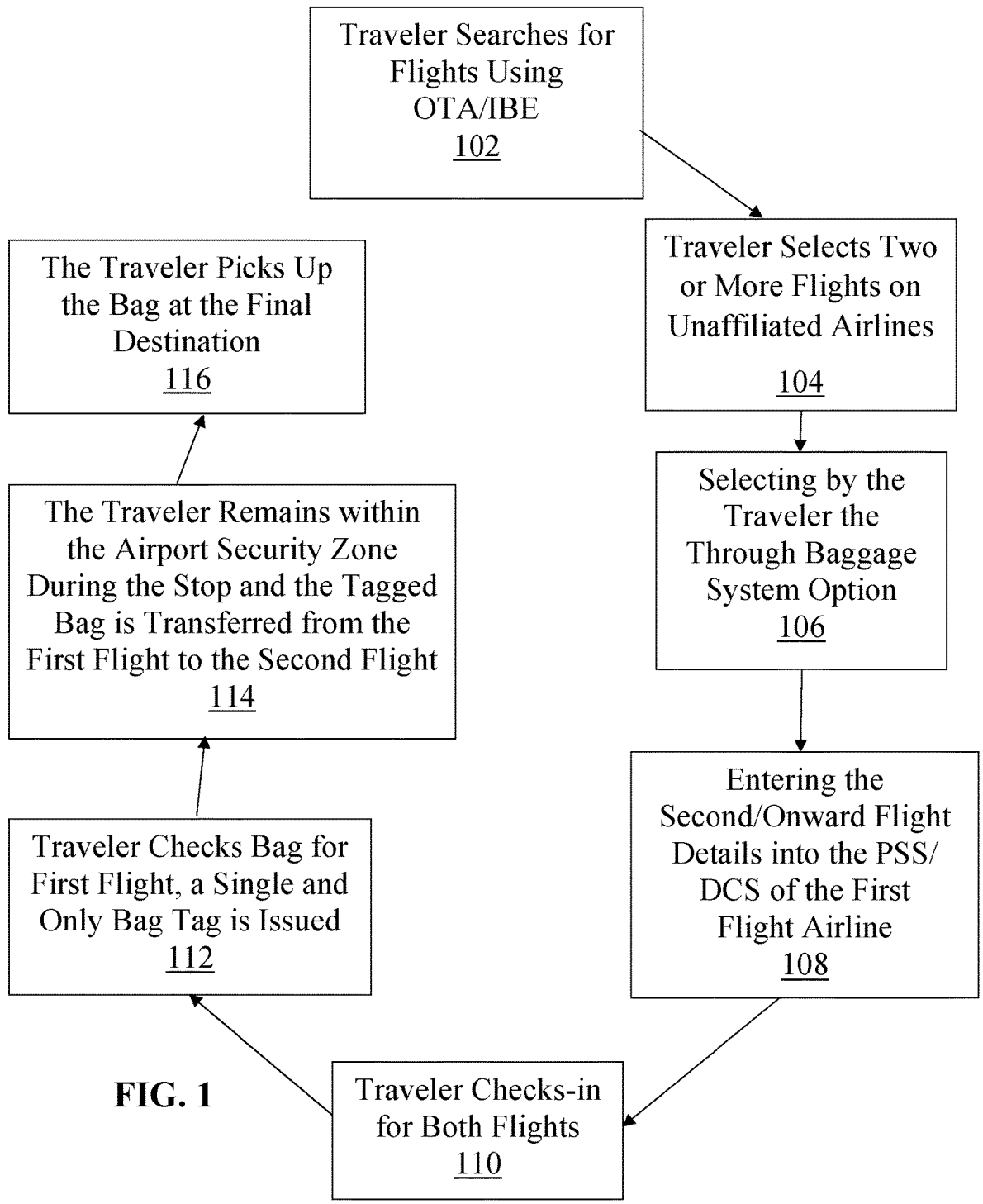
FIG. 1 is a flow block diagram of one embodiment of the through baggage process.

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still others will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signify both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. The storage can be local or remote, for example, in a Cloud Computing environment.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In the following description, certain terminology is used to describe certain features of the embodiments disclosed herein. For instance, the terms "computer", "computer system", "computing device", mobile computing device", "electronic data processing unit", or "server" refer to any device that processes information with an integrated circuit chip, including without limitation, personal computers, mainframe computers, workstations, servers, desktop computers, portable computers, laptop computers, embedded computers, wireless devices, including cellular phones, personal digital assistants, tablets, tablet computers, smart phones, portable game players, wearables, smart devices and hand-held computers.

As used herein, the term "Internet" refers to any collection of networks that utilizes standard protocols, whether Ethernet, Teletype, Type B Messaging, Edifact, Token ring, Wi-Fi, asynchronous transfer mode (ATM), Fiber Distributed Data Interface (FDDI), code division multiple access (CDMA), global systems for mobile communications (GSM), long term evolution (LTE), or any combination thereof.

As used herein, the term "website" refers to any document written in a mark-up language including, but not limited to, hypertext mark-up language (HTML) or virtual reality modeling language (VRML), dynamic HTML, extended mark-up language (XML), wireless markup language (WML), javascript object notation (JSON) or any other computer languages related thereto, as well as to any collection of such documents reachable through one specific Internet Protocol Address or at one specific World Wide Web site, or any document obtainable through any particular Uniform Resource Locator (URL). Furthermore, the terms "webpage," "page," "website," or "site" refers to any of the various documents and resources on the World Wide Web, in HTML/XHTML format with hypertext links to enable navigation from one page or section to another, or similar such resources used on the Internet.

Lexicon—Meaning of Certain Acronyms, Initialisms, and terms. Unless otherwise stated herein the following acronyms and initials stand for the following meaning:

DCS—Departure Control System. The master system that checks the passenger into the flight. This is either integrated into the PSS or a third-party system.

PSS—Passenger Service System

PNR—Passenger Name Record—essentially the customer reservation

BIM—Baggage Information Messages. The electronic messages sent to the different participating systems, in different airports, etc.

BSM—Baggage Service Messages or BHM—Baggage Handling Messages

BTM—Baggage Transfer Message, also called Transfer BSM.

BUM—Baggage unload message. Take this bag off the flight.

BPM—Baggage processed message.

BHS—Baggage Handling System. The mechanical and software system that handles bags in the airport. Typically owned and managed by the airport. Ground Handling and Airlines typically lease this service from the airports.

Bag Tag—Baggage tags, stickers, or inserts, that include QR Codes, barcodes, chips, radio frequency identification devices, scanner, paper with RFID, etc, which are affixed to or physically associated with luggage/baggage, and/or any technology that can assign a unique ID to a bag without a physical tag, used to ensure correct routing to the end point via the designated intermediary points.

RFID—Radio Frequency ID—special wireless tag that transmits its information (bag tag data) to an external reader. This is being mandated by IATA.

IATA—International Air Transport Association—largest association of airlines (mostly Full-Service Carriers).

APP—Mobile Application Software. Also called App or app.

API—Application Programming Interface. A machine to machine interaction facility.

OTA—Online Travel Agent—e.g. Expedia®.

IBE—Internet Booking Engine (usually accessed through an airline website).

Interline Baggage—checked baggage transported by two or more airlines

Airline—Is typically a travel company that provides flight transportation services, but for purposes of this disclosure, an airline may be any type of transportation company, including, but not limited to: cruise, train, bus, ship, etc.

Airport—Is typically a physical location that provides transportation related services, such as a complex of runways and buildings for the takeoff, landing, and maintenance of aircraft, with facilities for passengers. But, for purposes of this disclosure, an airport may be any transportation hub, including, but not limited to a combination, port, station, stop, etc.

Flight—Is typically a designation for a route taken by an airplane from a first airport to a second airport, but for purposes of this disclosure, a flight may be a journey on any type of transport, including train, auto, truck, bus, ship, cruise, etc.

FIG. 1 is a flow block diagram of one embodiment of the through baggage process using an internet booking engine (IBE) operated by an airline or by an intermediary such as an online travel agent (OTA). FIG. 1 shows the method as seen by the actions taken by the user when using an airline's or OTA's IBE. As shown in FIG. 1 the method may include searching for flights via an airline IBE or through an intermediary such as an OTA 102; selecting two or more flights on two different (affiliated or unaffiliated) airlines 104; selecting by the traveler the option to use the through baggage interline system 106; linking/entering/loading the second flight information into the PSS and/or DCS of the stop airport and/or the first airline 108; checking in by the traveler into both flights 110; checking at least one bag at the departure airport and affixing to the bag the only tag that will be needed 112; removing the bag from the first plane, transferring it to the ground handling team that will load it onto the second plane, all while the traveler remains in the airport and does not have to retrieve and recheck the bag 114; picking up the bag at the final destination 116.

Figure 2:
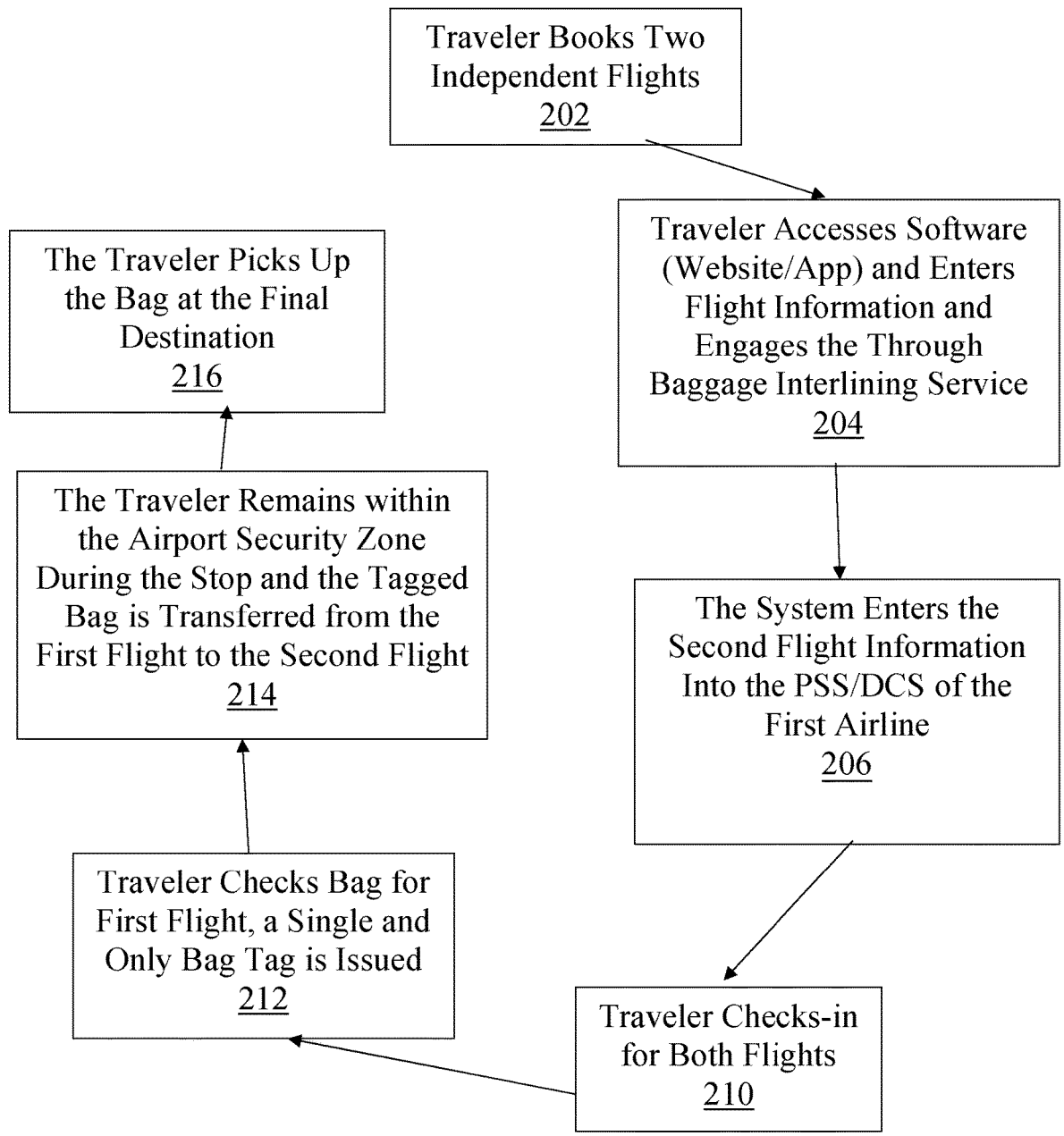
FIG. 2 is a flow block diagram of another embodiment of the through baggage process.

FIG. 2 is a flow block diagram of another embodiment of the through baggage process. FIG. 2 shows the another embodiment of the system of the travelers' actions when using a third party service provider. The method may comprise: booking two consecutive independent flights that have an airport that is the same for the first flight arrival and the second flight departure, by the user (in person, online, telephone, travel agency, etc.) 202; accessing by the traveler the through baggage service app or website to purchase or sign up for through baggage service, entering the flight information into the service 204 (this service may be offered, for example, by an independent third party or the stop/stopover airport); linking/entering/uploading the second flight information to the PSS/DCS of the first airline 206; checking in for both flights by the traveler 210; checking at least one bag for the first flight and generating/issuing a single and only bag tag for the checked bag 212; during the stop the traveler stays in the security zone (where airport flow permits) and does not have to retrieve the checked bag and re-check it into the second airline, and the bag is automatically transferred from the first plane to the second plane via one or more ground handling teams 214; retrieving the checked bag by the traveler at the final destination 216.

Figure 3:
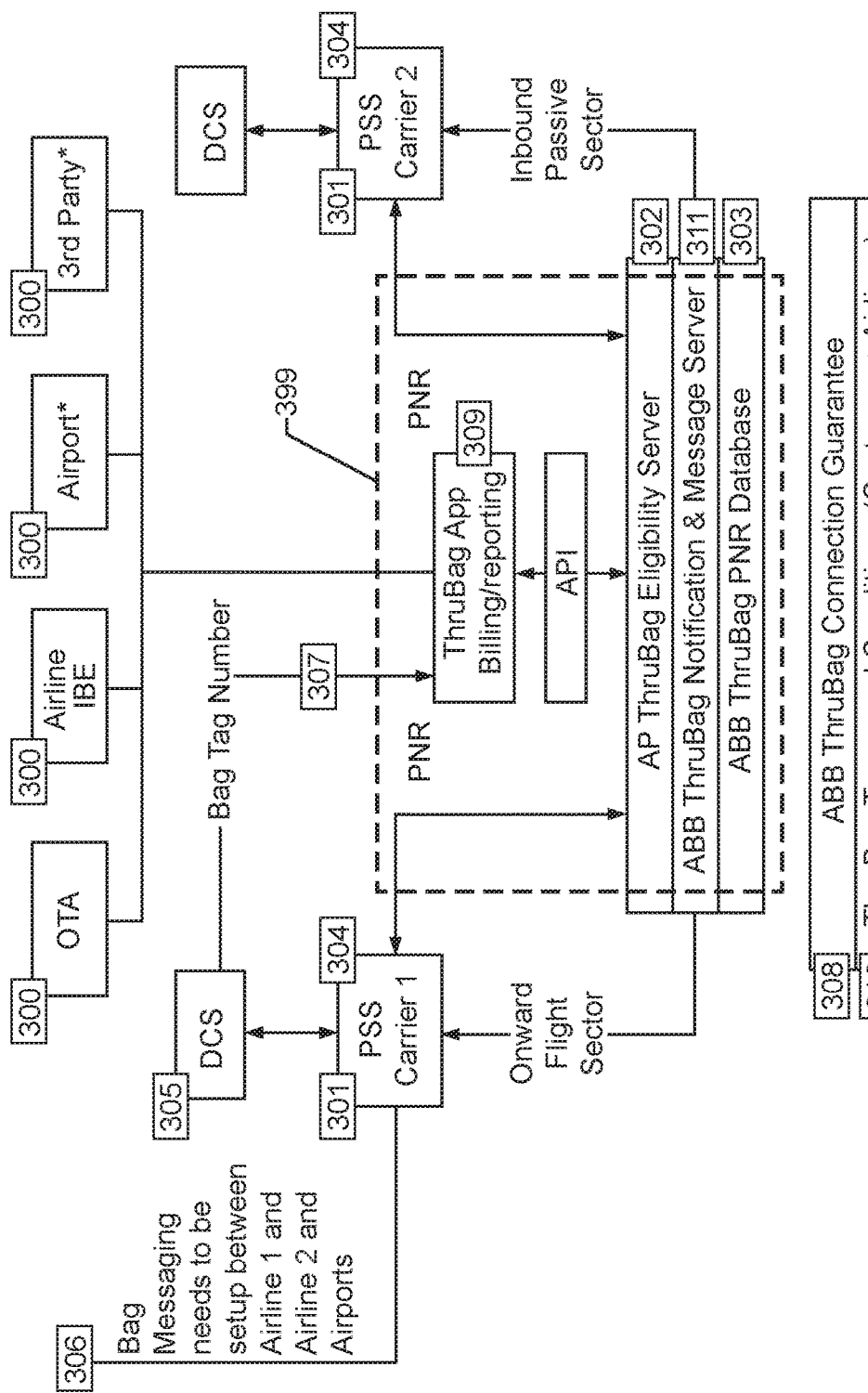
FIG. 3 is a diagram of one embodiment of the interaction of the system components.

FIG. 3 is a diagram of one embodiment of the interaction of the system components. The managed though baggage system may be controlled by a computer-based through baggage system comprising: an app or billing/reporting module/system 309, an application program interface, an eligibility server 302, a notification and message server 311, and a PNR database 303. The servers, interfaces, and software of the through baggage system control and direct the proper information and messages to be sent and received in order to allow a checked bag to be passed/interlined from a first airline to a second airline via a single tag and without having the traveler retrieve and recheck the bag.

In some embodiments, a traveler's eligibility to have his or her bag transferred via said system of the present disclosure is checked against a series of factors, which may include but is not limited to: whether the airlines are participating in the system, whether there is enough time to for the ground handling teams to properly and physically transfer the bag to the second airline, the amount of time possible to make a connection, and the like.

FIG. 3 shows that the customer may select to use the single tag through baggage interlining service through different service providers including, but not limited to: OTA, airline IBE, airport/s, or third-party service providers 300. Once selected, the user may be required to pay for the service and the purchase/selection of the service is reported/uploaded 309. The through baggage service is typically purchased when the user books/purchases two connecting/consecutive flights. When the user books these flights, the traveler's passenger/flight information is created within the PSS of each of the carriers 301. The system may comprise a system eligibility server 302 that receives/retrieves the passenger/flight information from the two PSS 301. An eligibility check is performed to determine that the through baggage service is available for the traveler's itinerary. If the itinerary is eligible, the complete journey/manifest information is added to the PNR database 303. The manifest information is shared by the system 399 with the PSS of both carriers 304. The DCS 305 may be integrated into each of the PSS, or may be a separate third party system. The DCS 305/PSS 301 now have the information necessary to enable an interline bag tag to be issued, which will allow the bag to reach the final destination. The system may utilize a messaging system 306 to enable messages to be shared between both airlines, the first departure airport, the second airline, the stopover airport, and/or the final destination airport. In this manner, when the bag tag is issued, all future scans of the tag will be shared with all participating systems and databases. The system 399 receives 307 the details of the baggage tag created by the DCS.

The operator of the system 399 may provide a baggage interline connection guarantee at the stopover airport 308, which may be an insurance-like service that requires additional payment by the Airline/Airport 309. There may be terms and conditions that govern the liability and operating parameters of using the system 310. The system 399 may send notifications to the airlines and may reformat baggage handling messages (BHM) and baggage service messages (BSM) sent by the first carrier into a baggage transfer message (BTM) that is operable with the second carrier's system. In various embodiments the notification server 311 and or the reporting app 309 may send notifications to the Airline or traveler about the status of the traveler's checked bags.

The notification to the traveler system may send automatic, opt-in, opt-out, or requested messages to the traveler, including, but not limited to: bag has been accepted/loaded into the through baggage system; bag is in the custody of the airline; bag has been sent for loading; bag has been loaded onto the first flight; the bag and first flight are in route to the stopover; bag has arrived at the stopover airport; bag is now in the custody of the first ground handling team; optional—additional tags added; optional—bag is now in the custody of a second ground handling team; bag is being sent for loading; bag has been loaded onto the second flight; the bag and first flight are in route to the final destination/second stopover; and/or bag has arrived and is headed to baggage claim.

Figure 4:
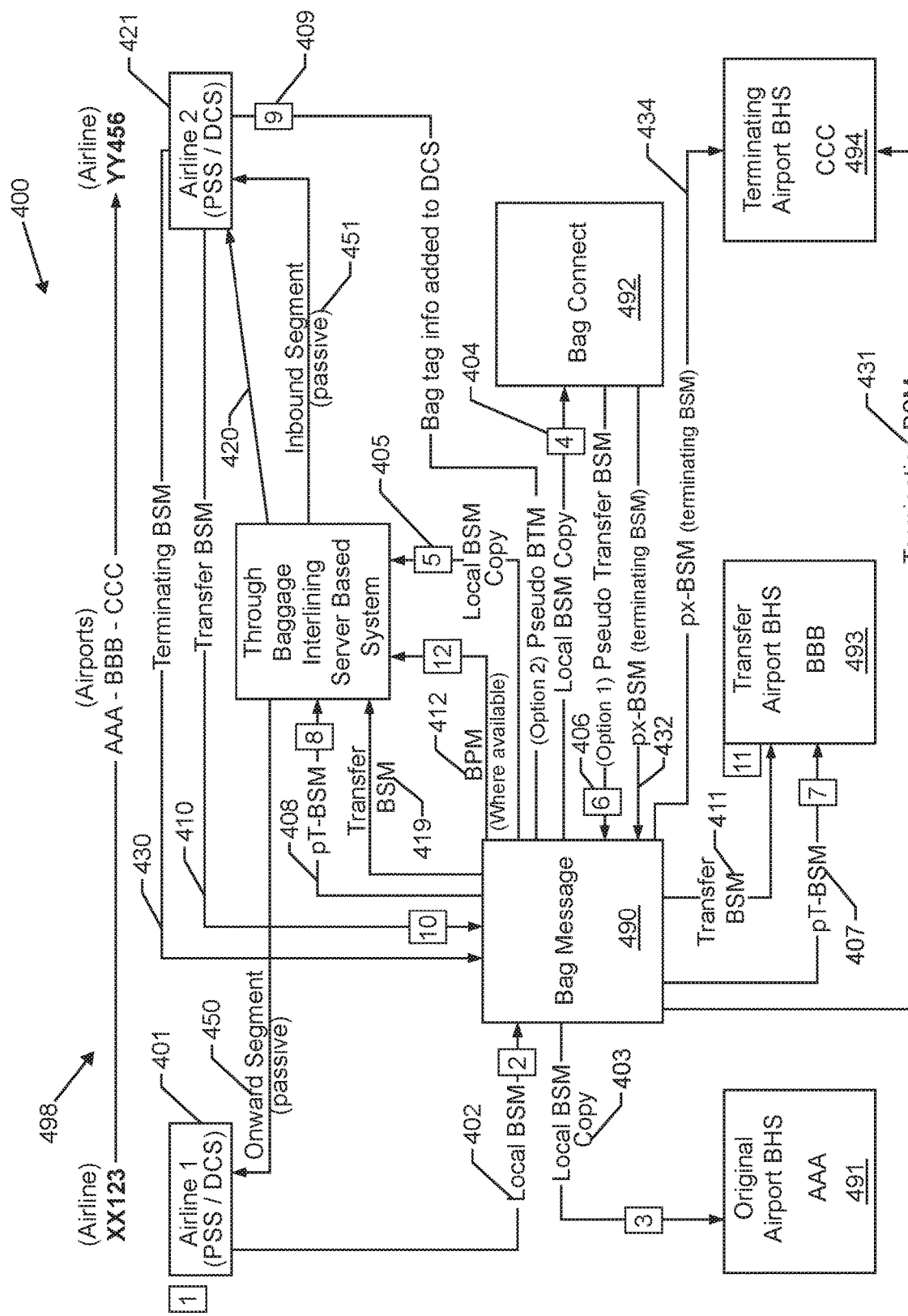
FIG. 4 is diagram of one embodiment of the messaging system.

FIG. 4 is diagram of one embodiment of the messaging system. The flow of the messaging system 400 is determined by the current messaging systems of the airports and airlines involved and the through baggage interlining server based system 399. Typically, the airports involved will need to have an automated baggage sortation or reconciliation system, which can send and receive electronic messages and notifications. In FIG. 4, the message system 400 follows the flow 498 as bags move between airline XX123, airline YY456, Airport AAA (start), Airport BBB (the stopover airport), and Airport CCC (the final destination airport). There may be two (2), three (3), or even more stopover airports, not just one (1). Once the user purchases tickets from Airline XX123 and Airline YY456 and selects to have the interlining service provided by system 399, the system 399 provides 450, 451 flight information to Airline 1 401 and to Airline 2 421.

As shown in FIG. 4, the passenger checks in with Airline 1 401, checks at least one bag and at least one bag tag is printed 401. The baggage information is linked to the traveler in the Airline 1 401 PSS/DCS. A local BSM is generated by Airline 1 401 and sent 402 to Bag Message 490. Bag Message 490 may be an existing bag messaging system that is used by airports and airlines to manage and track bags as they go through their journey. The Bag Message 490 may, for example, have been created by SITA®, which is a transportation logistics company. In other embodiments, Bag Message 490 may be a module or system that is part of, or controlled by, the system 399. A local copy 403 of the BSM is sent to the baggage handling system (BHS) of Airport AAA 491. The Bag Message 490 also sends 404 the local BSM to Bag Connect 492. Bag Connect 492 may be a baggage connection system that is used by airports and airlines to manage baggage that needs to be removed from one flight and put onto another flight. Bag Connect 492 may be an independent system or it may be a module or system that is part of or controlled by system 399. Bag Message 490 and Bag Connect 492 are configured to recognize that the through baggage interlining system 399 is connected, and they may send 405 a copy of the local BSM to the system 399. In one embodiment, referred to as Option 1, the Bag Connect 492 may generate and send a pseudo transfer BSM 406 (in Orange) to Bag Message 490. The Bag Message 490 may forward the pseudo transfer BSM 407 (in Orange) to the Transfer Airport bag handling system (BHS) BBB 493. If required, the Bag Message 490 may forward the pseudo transfer BSM 408 (in Orange) to the system 399, which processes/reformats the BSM and then sends 420 it to the Airline 2 421. In this manner, the Bag Tag information is entered into the DCS of Airline 421.

In one embodiment, referred to as Option 2, the Bag Message 490 sends 409 the pseudo BTM directly to the PSS/DCS of Airline 2 421. In this manner the Bag Tag information is added to the DCS/PSS of Airline 2 421. Airline 2 421 will generate and send 410 its own transfer BSM to Bag Message 490. Bag Message 490 will send 411 the transfer BSM to the BHS of transfer airport BBB 493 and, optionally, send 419 to system 399. If the Airport BBB 493 supports baggage processed messages (BPM) information and shares this with Bag Message 490, then Bag Message 490 can forward 412 this to System 399.

As part of Option 2, if the airline 2 421 has the capability of generating terminating BSM, airline 2 421 can forward 430 the terminating BSM to Bag Message 490. Bag Message 490 may forward the terminating BSM to the terminating airport CCC 494. Alternatively, Bag Connect 492 can generate a pseudo terminating BSM, which is then sent 432 to Bag Message 490, which is then sent 434 to terminating airport CCC 494.

In various embodiments the ground baggage handling teams of the first, second, and third airports, and of the two or more participating airlines may use the bag tag to appropriately and physically move the checked bag from the first flight to the second flight. Typically, the bag tag would be scanned (barcode or RFID) so that the computerized scanners can quickly inform the ground baggage handling teams what to do with the checked bags to ensure they get on the second flight. Any identification system may be used.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

Some portions of the preceding detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the present disclosure, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the figures may be performed by processing logic that comprises hardware (e.g. circuitry, dedicated logic, etc.), firmware, software (e.g., embodied on a non-transitory computer readable medium), or a combination thereof. Although the processes or methods are described above in terms of some sequential operations, it should be appreciated that some of the operations described may be performed in a different order. Moreover, some operations may be performed in parallel rather than sequentially.

While the present disclosure has been described in terms of particular variations and illustrative figures, those of ordinary skill in the art will recognize that the disclosure is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
receiving, using one or more processors, a bag tag number corresponding to a baggage and a baggage itinerary, the baggage itinerary including a first segment and a second segment, the first segment being operated by a first carrier and the second segment being operated by a second carrier, the first segment departing from a first location and arriving at a second location from which the second segment departs, the first carrier being associated with a first system that does not share information with a second system of the second carrier;
generating, using one or more processors and in response to receiving the bag tag number, a message for the second system of the second carrier for transferring the baggage to the second carrier from the first carrier, the message including the bag tag number and information necessary to interline the baggage from the first carrier to the second carrier at the second location;
in response to generating the message and using the one or more processors, sharing the message with the second carrier to enable an update of the second system of the second carrier with the bag tag number corresponding to the baggage, the update configured to identify the bag tag number with the baggage to be received by the second carrier for the second segment; and
forwarding, using the one or more processors, a bag service message generated by the second system of the second carrier to the second location based on the message, the bag service message configured to enable the unloading of the baggage from the first carrier after completing the first segment, and the bag service message configured to enable the loading of the baggage onto the second carrier to complete the second segment without the baggage having to be retrieved and re-checked at the second location.

2. The method of claim 1, wherein the first carrier and the second carrier are unaffiliated with each other.

3. The method of claim 1, wherein the first system and the second system comprise a passenger service system or a departure control system.

4. The method of claim 1, further comprising sending one or more notifications to a traveler device related to a status of the baggage one or more tagged checked bags.

5. The method of claim 1, wherein the first carrier and the second carrier comprise an airline, a cruise operator, a train operator, a bus operator, or a lodging operator.

6. The method of claim 1, wherein each of the first location and the second location comprise at least one of an airport, a train station, a bus stop, a port, or a lodging facility.

7. The method of claim 1, wherein the bag service message includes at least one of a RFID, a barcode, a sticker, a QR code, a chip, a label, or a photo for identifying the baggage.

8. A system, comprising:
at least one data processor; and
at least one memory storing instructions, which when executed by at least one data processor, result in operations comprising:
receiving a bag tag number corresponding to a baggage and a baggage itinerary, the baggage itinerary including a first segment and a second segment, the first segment being operated by a first carrier and the second segment being operated by a second carrier, the first segment departing from a first location and arriving at a second location from which the second segment departs, the first carrier being associated with a first system that does not share information with a second system of the second carrier;
generating, in response to receiving the bag tag number, a message for the second system of the second carrier for transferring the baggage to the second carrier from the first carrier, the message including the bag tag number and information necessary to be interlined interline the baggage from the first carrier to the second carrier at the second location;
in response to generating the message, sharing the message with the second carrier to enable an update of the second system of the second carrier with the bag tag number corresponding to the baggage, the update configured to identify the bag tag number with the baggage to be received by the second carrier for the second segment; and
forwarding a bag service message generated by the second system of the second carrier to the second location based on the message, the bag service message configured to enable the unloading of the baggage from the first carrier after completing the first segment, and the bag service message configured to enable the loading of the baggage onto the second carrier to complete the second segment without the baggage having to be retrieved and re-checked at the second location.

9. The system of claim 8, wherein the first carrier and the second carrier are unaffiliated with each other.

10. The system of claim 8, wherein first system and the second system comprise a passenger service system or a departure control system.

11. The system of claim 8, further comprising sending one or more notifications to a traveler device related to a status of the baggage.

12. The system of claim 8, wherein the first carrier and the second carrier comprise an airline, a cruise operator, a train operator, a bus operator, or a lodging operator.

13. The system of claim 8, wherein the bag service message includes at least one of a RFID, a barcode, a sticker, a QR code, a chip, a label, or a photo for identifying the baggage.

14. The system of claim 8, wherein each of the first location and the second location comprise at least one of an airport, a train station, a bus stop, a port, or a lodging facility.

15. The system of claim 8, wherein said first carrier and second carrier are the same carrier and are affiliated with each other and the first system does not share information with the second system of the second carrier.

\* \* \* \* \*